United States Patent [19]

Aprahamian et al.

[11] 4,217,558
[45] Aug. 12, 1980

[54] PULSED CHEMICAL LASER SYSTEM

[75] Inventors: Robert Aprahamian, Marina del Rey; Joseph Miller, Tarzana, both of Calif.

[73] Assignee: TRW Inc., Redondo Beach, Calif.

[21] Appl. No.: 663,404

[22] Filed: Mar. 3, 1976

[51] Int. Cl.² .................... H01S 3/05; H01S 3/08; H01S 3/09

[52] U.S. Cl. .................... 331/94.5 C; 330/4.3; 331/94.5 G

[58] Field of Search .................... 330/4.3; 331/94.5 C, 331/94.5 D, 94.5 Q, 94.5 G, 94.5 P

[56] References Cited

U.S. PATENT DOCUMENTS

| 3,310,753 | 3/1967 | Burkhalter | 331/94.5 Q |
| 3,311,844 | 3/1967 | Di Curcio | 331/94.5 P |
| 3,312,905 | 4/1967 | Lewis | 330/4.3 |
| 3,486,129 | 12/1969 | Van Tran et al. | 331/94.5 Q |
| 3,543,183 | 11/1970 | Heimann | 331/94.5 C |

OTHER PUBLICATIONS

Warren, "Chemical Lasers", 4/75, pp. 36-49, Astronautics & Aeronautics.
Aprahamian, "Pulsed Electron Beam Initiated Chemical Laser Operating on the $H_2/F_2$ Chain Reaction", 3/1/74, pp. 239-242, Appl. Phys. Lett., vol. 24, #5.

Primary Examiner—Nelson Moskowitz
Attorney, Agent, or Firm—John J. Connors; Donald R. Nyhagen

[57] ABSTRACT

A plurality of pulsed chemical lasers such as HF or DF lasers are disposed symmetrically about a central axis. Each laser is energized sequentially so that the resulting output laser pulses have substantially consecutive time duration. Hence, the duration of the laser pulses equals the duration of each laser times the number of lasers. Reflectors are provided for combining the output pulses of each laser to generate a segmented output beam.

8 Claims, 4 Drawing Figures

PULSED CHEMICAL LASER SYSTEM

BACKGROUND OF THE INVENTION

This invention relates generally to chemical lasers and particularly to a pulsed chemical laser system having a pulse duration which is longer than that of an individual laser.

For many applications it is desired to utilize a pulsed chemical laser because such a laser has a very high energy output and desirable atmospheric propagation characteristics. On the other hand, for some applications the duration of the laser pulse is insufficient. For example, it may be desirable to propagate a high energy laser pulse through the atmosphere. In that case, the normal pulse length of a chemical HF or DF laser which is about 4 to 6 microseconds is insufficient. What is desired is a pulse length on the order of 40 microseconds to maximize the delivery of energy while minimizing deliterious atmospheric effects.

It is accordingly an object of the present invention to provide a chemical laser system of the pulse type where the duration of the combined pulse can be substantially extended.

A further object of the present invention is to provide such a laser having a substantially higher power per unit of time than that of an individual pulsed chemical laser.

SUMMARY OF THE INVENTION

In accordance with the present invention there is provided a laser system which comprises a plurality of pulsed chemical lasers. Each of the lasers is capable of generating a short duration, high power output pulse. Hence, the system comprises a plurality of chemical lasers disposed about a central axis.

Each laser in turn comprises an elongated chamber. In the chamber is disposed means for uniformly initiating a chemical reaction, for instance a sustainer cathode and a sustainer anode opposed to each other and within the chamber. Means are provided for feeding a chemical fuel into the chamber and for exhausting the combusted fuel. The chemical fuel may, for example, consist of $H_2$ and $F_2$; or of $D_2$ and $F_2$, where H is a hydrogen atom, D is a deuterium atom and F is fluorine.

Means are provided for preionizing the oxidized reactant. This may be effected by high energy electrons injected into the chamber or by photons. Hence successive laser pulses with substantially consecutive time durations are generated in respective ones of the lasers. To this end a high voltage may cyclically be applied between the cathode and anode of each laser and the electrons may be cyclically injected into the feed chamber.

Finally, optical means are provided including a plurality of reflectors for defining an optical cavity in each laser along the axis and for combining the output laser pulses into a segmented output beam. Hence, the collimated beam has a time duration substantially equal to the duration of each laser pulse times the number of lasers.

The novel features that are considered characteristic of this invention are set forth with particularity in the appended claims. The invention itself, however, as well as to its organization and method of operation, as well as additional objects and advantages thereof, will best be understood from the following description when read in connection with the accompanying drawings.

DESCRIPTION OF THE PREFERRED EMBODIMENT

Figure 1:
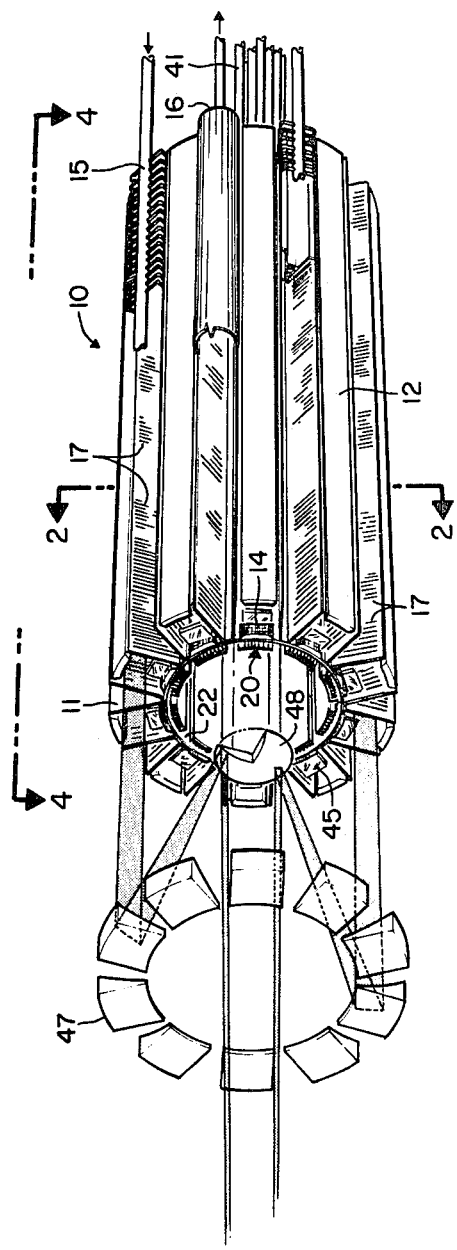
FIG. 1 is a view in perspective of a laser system embodying the present invention and consisting of a plurality of pulsed chemical lasers.

Referring now to the drawings there is illustrated a chemical laser system comprising a plurality of pulsed chemical lasers. By way of example, there has been illustrated in the drawings a system comprising ten individual pulsed chemical lasers. Depending on the desired pulse length more or fewer lasers may be employed. The lasers illustrated are HF or DF lasers. However, it will be understood that other chemical lasers such as CO, XeF, KrF and HCl lasers may be used instead. All of these lasers are characterized by the fact that they are chemical lasers and generate output pulses of short duration.

Each of the lasers such as laser 10 is provided with a cavity 11 which may be considered the optical resonant cavity. Disposed in each cavity 11 is a cathode 12 and an anode 14. Preferably, the cathode 12 has a Rogowski profile. This will minimize arcing. The anode 14 may consist of a screen as shown and again has a profile to minimize arcing. The cathode 12 and anode 14 may be termed the sustainer cathode and anode respectively.

Figure 2:
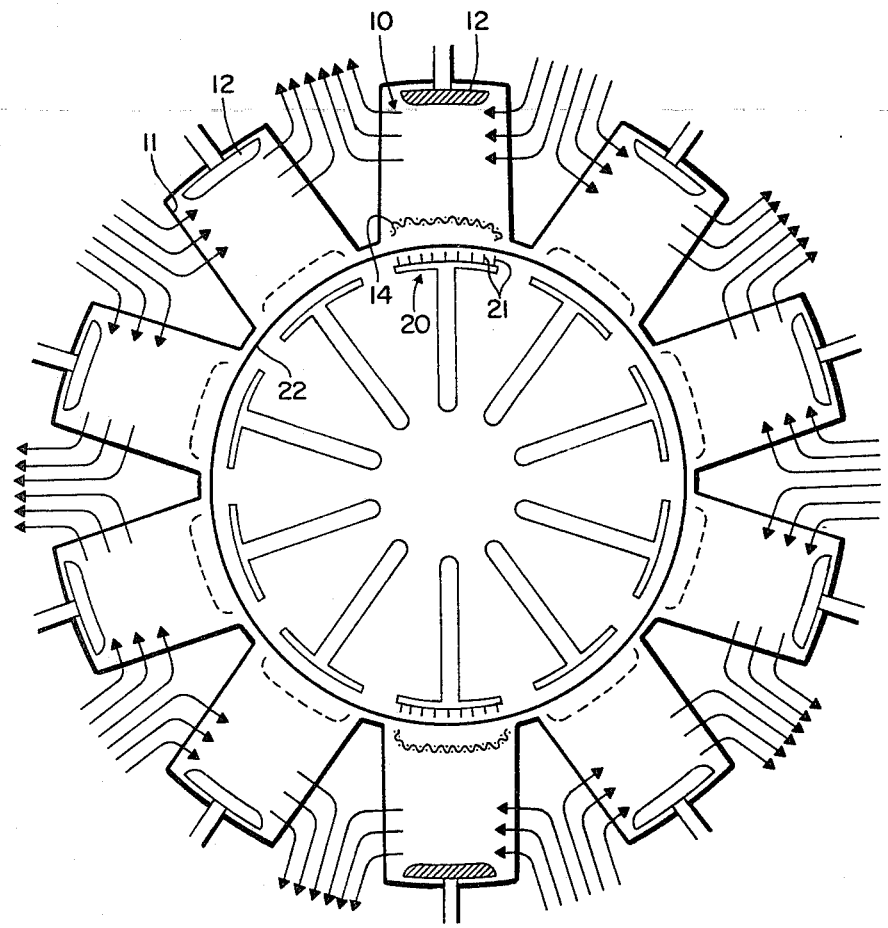
FIG. 2 is a cross-sectional view on enlarged scale taken on line 2—2 of FIG. 1 and illustrating the resonant chambers of the ten lasers shown by way of example.

The premixed fuel is fed into the cavity 11 through a fuel manifold 15. In turn the combusted fuel is exhausted through the exhaust 16. As will be evident from FIGS. 1 and 2, the fuel manifold 15 serves two adjacent cavities as does the fuel exhaust 16. The premixed fuel is preionized by injecting high velocity electrons into the cavity 11. The electrons are generated by an electron gun 20 which preferably is a cold cathode gun. Its surface facing the anode 14 is provided with parallel plate-like elements 21 which may, for example, consist of razor blades or thin sheets or graphite. A foil 22 of cylindrical shape surrounds the cold cathode electron gun 20. The foil is a thin foil capable of passing electrons into each of the chambers 11. The electrons are generated in a vacuum within the cylindrical foil 22, while the pressure in the respective chambers 11 may be as high as 4 atmospheres. Such a foil may, for example, consist of Mylar, aluminum or the like material capable of passing electrons. The foil 22 may be mechanically supported against the pressure in the cavity 11.

Figure 3:
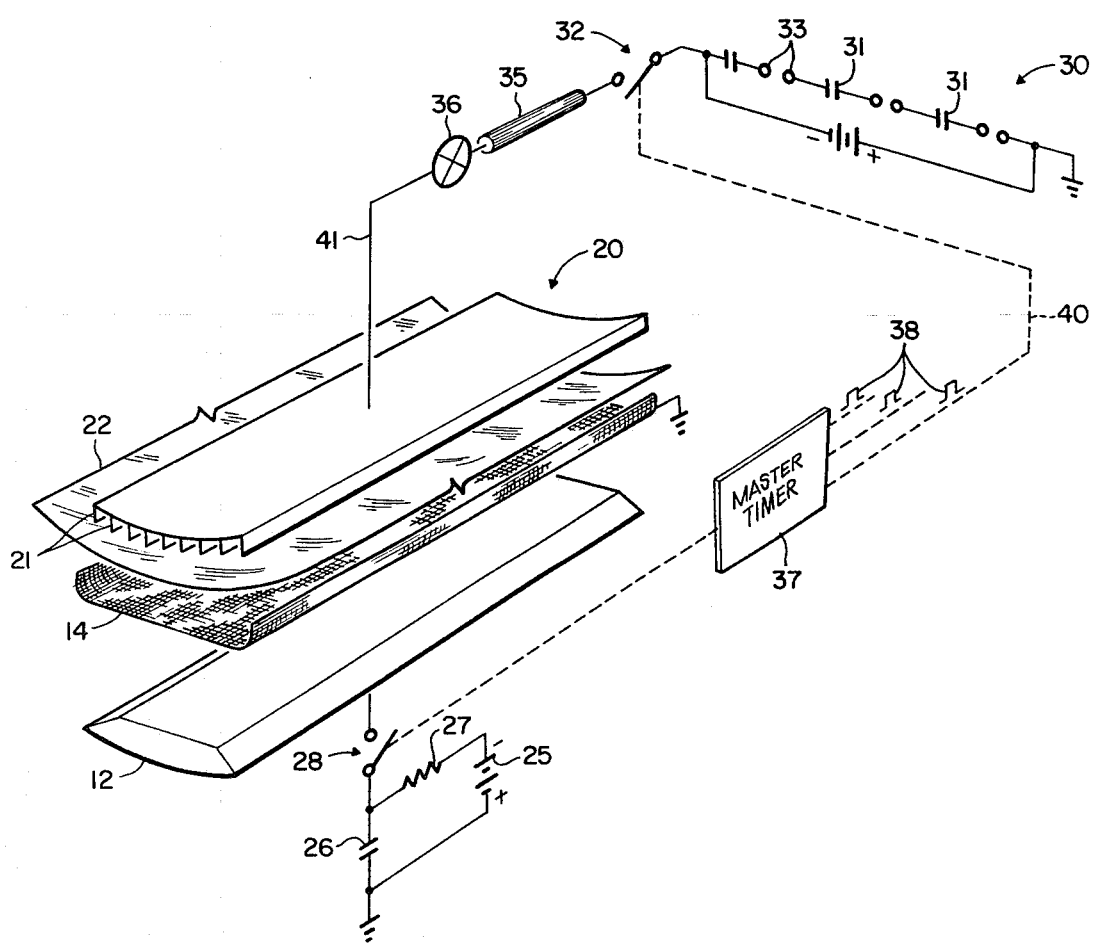
FIG. 3 is a view in perspective on enlarged scale of a portion of a sustainer cathode and anode of a single laser with an associated cold cathode for injecting electrons and including a master timer and high voltage generator for the respective cathodes.

Preferably, as shown in FIG. 3, the anode 14 is grounded. A voltage source such as a battery 25 may be provided and having its positive terminal grounded. The battery 25 is connected across a capacitor 26 through a resistor 27. This will charge the capacitor 26 to a predetermined voltage. When the switch 28 is closed the voltage of the capacitor 26 is instantly applied to the sustainer cathode 12. The voltage of the voltage source 25 may be on the order of 200 kv.

Another high voltage source is formed by what is known as a Marx generator 30. It consists of a series of capacitors 31 connected between ground and another switch 32 through spark gaps or the like 33. Hence, when the switch 32 is closed the high voltage is applied to a coaxial line 35 which is known as a Blumlein. This is simply a coaxial cable filled with water and serves as an impedance match between the Marx generator 30 and a water switch 36.

This arrangement operates as follows: the Marx generator 30 looks like a single capacitor and provides a large inductance due to the arcs between the individual capacitors 31. When the switch 32 is closed the large voltage of the generator 30 is applied to the coaxial line 35. The coaxial line has a very low inductance, hence when the water switch 36 is closed and turned a very high voltage short duration pulse on the order of a few tenths of a microsecond is applied to the cold cathode 20.

As pointed out before, the voltage applied to the sustainer cathode 12 is about 200 kv, and that applied to the cold cathode 20 is about 500 kv. A master timer 37 is provided which generates output pulses 38 which follow each other in time sequence. One of these pulses is applied through a lead 40 to the switches 32 and 28. This will make it possible to sequentially energize the ten lasers in such a manner that each will generate an output pulse with substantially consecutive time durations.

The leads 41 are connected between each of the cold cathodes 20 and the Marx generator 30. By closing the switch 32 a short discharge or electron pulse is generated which may, for example, have a time duration of 50 nanoseconds to preionize the gas. Thereafter, the reaction is sustained by the electric field generated between the sustainer cathode 12 and the sustainer anode 14.

The reaction which takes place for an HF laser is as follows:

$$F_2 + e^- \rightarrow F + F + e^- \tag{1}$$

$$F + H_2 \rightarrow HF^* + H \tag{2}$$

$$H + F_2 \rightarrow HF^* + F \tag{3}$$

In these equations HF* indicates an excited molecule. It will also be understood that in these equations the H may be replaced by a D.

Alternatively each laser cavity 11 may be surrounded by a suitable light source and energized in sequence to generate a light flash. This will provide photons which dissociate $F_2$ as follows:

$$F_2 + h\nu \rightarrow F + F \tag{4}$$

Figure 4:
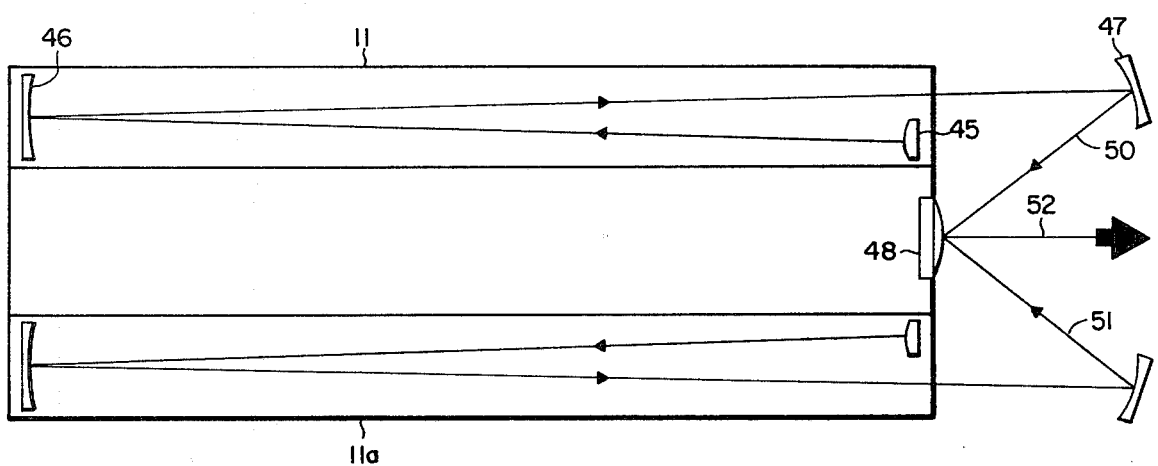
FIG. 4 is a longitudinal sectional view taken on line 4—4 of FIG. 1 and illustrating the optical arrangement of generating an optical cavity and combining the output laser pulses into a segmented output beam.

Referring now to FIG. 4, there is illustrated by way of example how the optical cavity may be formed and how the individual output beams may be joined to form a single collimated beam. Thus, as shown in FIG. 4, a reflector 45 is provided at one end of the cavity 11 and takes up only a portion of the available space. A rear reflector 46 will reflect the laser light into another reflector 47. The reflectors 45, 46 and 47 may be curved or spherical mirrors. Another spherical mirror 48 will combine the laser beam 50 from cavity 11 and laser beam 51 from cavity 11a to generate a segmented output beam 52. Hence, it will be apparent that the mirrors 45, 46 are the resonator mirrors which define the optical cavity.

It will now be apparent that each one of the optical cavities such as the cavity 11 will generate a single pulselet. The individual pulselets are each directed in a generally conical beam by the mirrors 47, 48. Thus, each pulselet travels in a separate path. Each pulselet is separated from the succeeding pulselet in time. This will then generate a segmented output beam where the individual pulselets are spatially separated. On the other hand, the individual pulselets are substantially successively in time to generate what has been called a segmented output beam.

As indicated before, the output beam has a power n times that of an individual laser. Also, the pulse duration may be on the order of 40 microseconds depending on the number of laser beams used.

It should be noted that if all the output power per unit of time of the laser of the invention would occur in a very short time period it would cause breakdown of the air. This would generate a plasma shield in the neighborhood of the target thus shielding the target from the remainder of the laser beam. Therefore, it is preferred to deliver the energy to the target by means of a plurality of pulselets which are consecutive in time. On the other hand, the total duration of the resulting segmented output pulse should not be too large because this in turn would cause what is known as blooming of the atmosphere, that is a change in the index of refraction of the air.

There has thus been disclosed a chemical laser system which will generate an output pulse having a time duration which is a multiple of that of an individual pulsed chemical laser. The time duration simply depends on the number of lasers used. The lasers are energized sequentially so that the output pulselets have substantially consecutive time durations. This will not only increase the overall pulse length, but will also increase the overall power per unit of time compared to a single cavity.

What is claimed is:

1. A laser system comprising a plurality of pulsed chemical lasers, each being capable of generating a short duration, high power, output pulse, said system comprising:
    (a) a plurality of chemical lasers, disposed about a central axis, each of said lasers comprising:
    (b) an elongated chamber;
    (c) means for feeding a chemical fuel into said chamber and for exhausting the combusted fuel;
    (d) means for initiating a chemical reaction of the fuel in said chamber;
    (e) means for preionizing the fuel;
    (f) means for cyclically initiating the chemical reaction in each laser and for cyclically preionizing the fuel in said chamber in such a manner that successive laser pulselets with substantially consecutive time durations are generated in respective ones of said lasers; and
    (g) optical means including a plurality of reflectors for defining an optical cavity in each of said lasers along said axis and for combining the output laser pulselets.

2. A laser system as defined in claim 1 wherein said means for initiating a chemical reaction includes a sustainer anode and a sustainer cathode disposed opposite to each other in said chamber.

3. A system as defined in claim 2 wherein said means for preionizing the fuel includes means for periodically injecting electrons including a cold cathode having a plurality of spaced, substantially parallel sheet like elements, and a high voltage generator for energizing said cold cathode.

4. A laser system as defined in claim 3 wherein said cold cathode is separated from said sustainer anode and cathode by a foil of a material which permits electrons to pass and capable of withstanding the pressure in said chamber.

5. A system as defined in claim 2 wherein said sustainer anode consists of a screen having a profile to minimize arcing.

6. A system as defined in claim 2 wherein said sustainer cathode has a profile to minimize arcing.

7. A system as defined in claim 1 wherein said optical means consists of a plurality of reflectors including a convex mirror disposed along said central axis for focusing the output pulselets of each of said lasers and for generating a segmented output beam.

8. A system as defined in claim 7 wherein a pair of resonator mirrors are disposed in said cavity at opposite sides thereof along said axis to provide a resonant cavity.

* * * * *